US011012919B2

United States Patent
Rajendiran et al.

(10) Patent No.: US 11,012,919 B2
(45) Date of Patent: May 18, 2021

(54) METHODS AND SYSTEMS FOR MITIGATING CONNECTION IMPACT ON SERVICE INFRASTRUCTURE

(71) Applicant: SYMBOL TECHNOLOGIES, LLC, Lincolnshire, IL (US)

(72) Inventors: Subramani Rajendiran, Bangalore (IN); Satish Shivarudrappa, Bangalore (IN); Sandeep Ramakrishnan, Bangalore (IN); Nagendra Desai, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 111 days.

(21) Appl. No.: 15/835,015

(22) Filed: Dec. 7, 2017

(65) Prior Publication Data

US 2019/0182751 A1    Jun. 13, 2019

(51) Int. Cl.
| | |
|---|---|
| *H04W 48/06* | (2009.01) |
| *H04W 28/02* | (2009.01) |
| *H04W 76/38* | (2018.01) |
| *H04W 48/16* | (2009.01) |
| *H04W 24/10* | (2009.01) |
| *H04W 24/08* | (2009.01) |
| *H04W 84/12* | (2009.01) |

(52) U.S. Cl.
CPC ....... *H04W 48/06* (2013.01); *H04W 28/0247* (2013.01); *H04W 76/38* (2018.02); *H04W 24/08* (2013.01); *H04W 24/10* (2013.01); *H04W 28/0289* (2013.01); *H04W 48/16* (2013.01); *H04W 84/12* (2013.01)

(58) Field of Classification Search
CPC ......... H04L 63/10; H04L 67/22; H04L 43/16; H04W 28/27; H04W 76/19; H04W 28/0289; H04W 76/38; H04W 48/06; H04W 28/0247; H04W 84/12
See application file for complete search history.

(56) References Cited

U.S. PATENT DOCUMENTS

| | | | | |
|---|---|---|---|---|
| 2005/0174961 A1* | 8/2005 | Hrastar | ............. | H04W 12/1204 370/328 |
| 2006/0285486 A1* | 12/2006 | Roberts | ............... | H04L 12/5601 370/216 |
| 2008/0133767 A1* | 6/2008 | Birrer | .................. | H04L 67/104 709/231 |
| 2010/0035576 A1* | 2/2010 | Jones | .................. | H04L 63/108 455/406 |
| 2013/0223419 A1* | 8/2013 | Ghosh | ............... | H04W 52/0235 370/338 |
| 2014/0341137 A1* | 11/2014 | Crowle | ............. | H04W 72/1231 370/329 |
| 2015/0063128 A1* | 3/2015 | Garikipati | ............ | H04B 7/0452 370/252 |

(Continued)

*Primary Examiner* — Syed Ali

(57) ABSTRACT

A method in a client device of mitigating connection impact on service infrastructure includes: prior to initiating a connection to a service, generating an impact indicator corresponding to the service, the impact indicator representing a predicted load at the service; determining whether the impact indicator exceeds an impact threshold; when the impact indicator exceeds the impact threshold, incrementing a connection interval according to a backoff interval; and initiating a connection with the service upon expiry of the connection interval.

16 Claims, 8 Drawing Sheets

(56) References Cited

U.S. PATENT DOCUMENTS

| | | | |
|---|---|---|---|
| 2015/0139010 A1* | 5/2015 | Jeong | H04W 48/14 370/252 |
| 2015/0245358 A1* | 8/2015 | Schmidt | H04L 43/0888 370/329 |
| 2016/0006264 A1* | 1/2016 | Alperin | H02J 50/80 307/104 |
| 2016/0021041 A1* | 1/2016 | Zacharias | H04L 51/10 709/203 |
| 2016/0276873 A1* | 9/2016 | Ben Hanoch | H02J 7/025 |
| 2017/0071007 A1* | 3/2017 | Wang | H04W 4/70 |
| 2018/0062977 A1* | 3/2018 | Mahalank | H04W 8/18 |
| 2019/0246312 A1* | 8/2019 | Kim | H04W 52/365 |

* cited by examiner

METHODS AND SYSTEMS FOR MITIGATING CONNECTION IMPACT ON SERVICE INFRASTRUCTURE

BACKGROUND

In environments (e.g. warehouses) in which substantial numbers of wireless devices, such as handheld barcode scanners, are deployed, the devices are typically connected to a wireless network deployed within the warehouse, and may also be connected to a variety of other services via the network. Under certain conditions (e.g. following a power loss leading to an outage of the services), the wireless devices may attempt to reconnect to the wireless network and other services. Such reconnection attempts may have a negative impact on the services.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
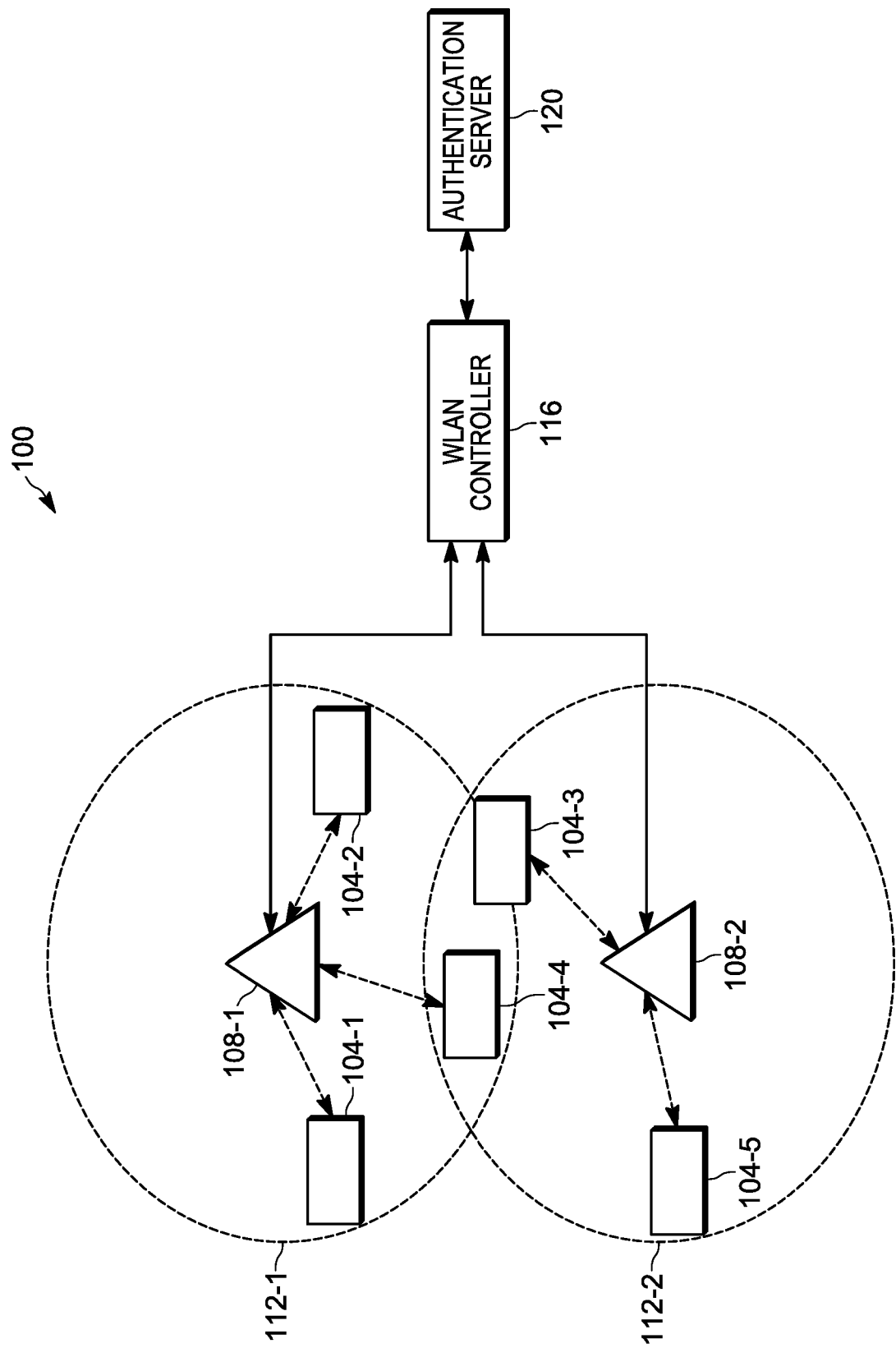
FIG. 1 is a schematic diagram of a communications system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a client device of mitigating connection impact on service infrastructure, comprising: prior to initiating a connection to a service, generating an impact indicator corresponding to the service, the impact indicator representing a predicted load at the service; determining whether the impact indicator exceeds an impact threshold; when the impact indicator exceeds the impact threshold, incrementing a connection interval according to a backoff interval; and initiating a connection with the service upon expiry of the connection interval.

Further examples disclosed herein are directed to a client device for mitigating connection impact on service infrastructure, comprising: a communications interface; a processor interconnected with the communications interface, the processor configured to: prior to initiating a connection to a service, generate an impact indicator corresponding to the service, the impact indicator representing a predicted load at the service; determine whether the impact indicator exceeds an impact threshold; when the impact indicator exceeds the impact threshold, increment a connection interval according to a backoff interval; and initiate a connection with the service upon expiry of the connection interval.

FIG. 1 depicts a communication system 100 including a plurality of wireless client computing devices, of which four examples 104-1, 104-2, 104-3 and 104-4 (collectively referred to as the wireless client computing devices 104, and generically referred to as a wireless client computing device 104) are shown. The system 100 also includes a wireless network, such as a wireless local area network (WLAN) implemented by one or more access points, of which two examples 108-1 and 108-2 are shown, each providing an area of coverage 112-1, 112-2 within which the devices 104 may establish wireless connections with the access points 108 (e.g. according to a suitable member of the IEEE 802.11 family of communication standards).

The access points 108, in turn, can be connected to a WLAN controller 116, which in turn may be connected to a wide-area network (WAN, not shown) such as the Internet. The WLAN controller 116 is also, in the present example, connected to an authentication server 120, such as a remote authentication dial-in user service (RADIUS) server. The server 120 can be configured to authenticate the devices 104 prior to granting the devices 104 access to various functionality provided via the WLAN infrastructure, for example by other servers (not shown) connected to the WLAN controller 116. The WLAN infrastructure (that is, the access points 108 and the WLAN controller 116) and the server 120 are also referred to herein as services accessed by the devices 104. More specifically, the WLAN infrastructure constitutes a wireless networking service accessible to the devices 104, and the server 120 constitutes an authentication service accessible to the devices 104. In some embodiments, the server 120 may be implemented as a component of the WLAN controller 116, or as a component of an access point 108.

The system 100 can be deployed in a variety of environments, including for example a warehouse, production facility or the like. The client devices 104 may be barcode scanners, smartphones, tablet computers, label printers, RFID and/or NFC readers, or the like. The client devices 104 may therefore be configured to travel the facility and, following authentication with the server 120, exchange data with the server 120 or another server (not shown) via the WLAN implemented by the access points 108. While moving in the facility, each device 104 may leave the area of coverage 112 of one access point (e.g. the access point 108-2) and enter the area of coverage 112 of another access point (e.g. the access point 108-1). As will be apparent to those skilled in the art, the client devices 104 are configured in such situations to maintain a substantially consistent connection with the WLAN by roaming from one access point 108 to another. The client devices 104 can also be configured to maintain a substantially consistent connection with the server 120.

The client devices 104 are also configured, as will be understood by those skilled in the art, to re-establish wireless connections with the access points 108 in the event that such connections are lost. Similarly, the client devices 104 can be configured to re-establish connections with the server 120 (via the WLAN infrastructure) in the event that such connections are lost. Various conditions can cause the loss of a connection with an access point 108 at a given client device 104. For example, structural obstructions (e.g. walls, metal shelving, and the like) may form areas in the facility with poor connectivity. Various conditions at the client devices 104 themselves (e.g. low battery, software or hardware failures, and the like) may also cause loss of connectivity.

Further, an outage suffered by the WLAN infrastructure itself can cause the client devices 104 to lose their connections with the access points 108. For example, a given access point 108 may suffer an outage resulting from a reboot. As a further example, a power outage in the facility may result in the access points 108 and the WLAN controller 116 suffering an outage. WLAN infrastructure outages in the system 100 result in the loss of connections between the client devices 104 and the WLAN. As will be apparent, in the system 100 a loss of connectivity with the WLAN also causes a loss of connectivity with the server 120. Additional conditions, such as a reboot or other outage of the server 120, may cause a device 104 to lose a connection with the server 120 independently of the WLAN.

As noted above, because the client devices 104 are configured to re-establish connectivity with one or both of the WLAN infrastructure and the server 120 whenever such connectivity is lost, the above-mentioned outages may result in a substantial portion (up to and including all) of the client devices 104 attempting to re-establish connectivity with the service(s) that suffered the outage(s) simultaneously. Such a sudden increase in load on the services may cause network congestion or a further outage.

Under certain conditions the devices 104 may impose substantial increases in load on the above-mentioned services even in the absence of infrastructure outages. For example, a central computing device may deploy configuration updates to some or all of the devices. When implemented at each affected device 104, the configuration changes may require each affected device 104 to disconnect from and re-connect to one or more services. When configuration changes are deployed to a sufficient number of devices 104, the above-mentioned negative service impacts may result.

Further, in environments such as warehouses and other facilities in which substantial numbers of device 104 operate, devices 104 may be activated and deactivated according to a predetermined schedule, such as one or more shifts. Thus, when a shift begins (e.g. the first shift of a workday), some or all of the client devices 104 may be powered on, removed from charging cradles or the like, and seek to connect to the above-mentioned services. This scenario may also result in negative impacts on the services, when a sufficient number of devices 104 seek to establish connections substantially simultaneously.

The client devices 104 are therefore also configured, as discussed below in greater detail, to perform certain actions to reduce the impact of client connection attempts on network infrastructure.

Figure 2A:
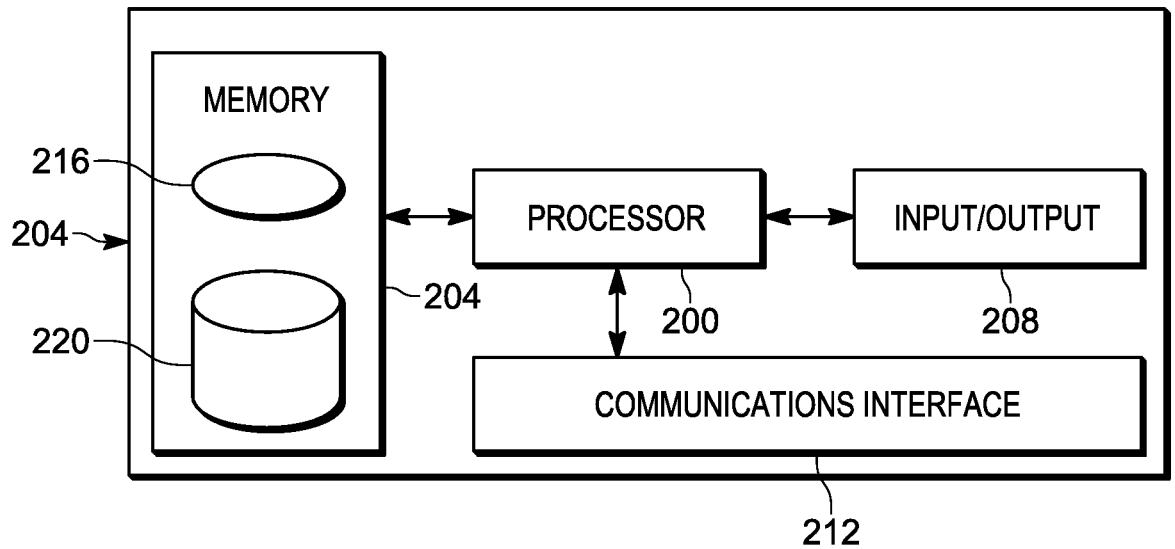
FIG. 2A is a block diagram of certain internal hardware components of a client device of FIG. 1.

Turning to FIG. 2A, certain internal components of a client device 104 are illustrated. Each of the client devices 104 in the system 100 include the components shown in FIG. 2A, although the client devices 104 may have heterogeneous form factors and implementations of the components shown in FIG. 2A.

The device 104 includes a central processing unit (CPU), also referred to as a processor 200, interconnected with a non-transitory computer readable storage medium, such as a memory 204. The memory 204 includes any suitable combination of volatile (e.g. Random Access Memory (RAM)) and non-volatile (e.g. read only memory (ROM), Electrically Erasable Programmable Read Only Memory (EEPROM), flash) memory. The processor 200 and the memory 204 each comprise one or more integrated circuits (ICs).

The device 104 also includes at least one input device, and at least one output device, illustrated in FIG. 2A as an input/output device 208 interconnected with the processor 200. The input device includes any suitable one, or any suitable combination of, a touch screen, a keypad, a trigger (e.g. to initiate the performance of any encoding or scanning task), and the like. The output device includes any suitable one, or any suitable combination of a display (e.g., integrated with the above-mentioned touch screen), a speaker, and the like. The input/output device 208 is configured to receive input and provide data representative of the received input to the processor 200, and to receive output from the processor 200 and present the output, e.g. via the emission of sound from the speaker, the rendering of visual indications on the display, and the like.

The device 104 also includes a communications interface 212, enabling the device 104 to exchange data with other computing devices, such as the access points 108. The communications interface 212 includes any suitable hardware (e.g. transmitters, receivers, network interface controllers and the like) allowing the device 104 to communicate, e.g. over the WLAN.

The components of the device 104 are interconnected by communication buses (not shown), and powered by a battery or other power source, over the above-mentioned communication buses or by distinct power buses (not shown).

The memory 204 of the device 104 stores a plurality of applications, each including a plurality of computer readable instructions executable by the processor 200. The execution of the above-mentioned instructions by the processor 200 causes the device 104 to implement certain functionality, as discussed herein. The applications are therefore said to be configured to perform that functionality in the discussion below. In the present example, the memory 204 of the device 104 stores a communication control application 216, also referred to herein as the application 216. The device 104 is configured, via execution of the application 216 by the processor 200, to generate and update impact indicators for one or more services. In the embodiments discussed herein, the services include WLAN connectivity via the access points 108, and authentication via the server 120. The impact indicator for a given service is an indication of the potential impact of an attempt by the device 104 to connect to the service. As will be seen below, the higher the impact indicator, the higher the potential for a connection attempt by the device 104 to have a negative impact on the relevant service.

Under certain conditions, the application 216 alters the behavior of the device 104 when establishing connections with the services (e.g. with the access points 108 and/or the server 120), to mitigate the impact of those connections predicted by the impact indicator. To that end, the memory 204 also stores a repository 220, which contains records of events upon which the impact indicators for each service are based.

In other examples, the processor 200, as configured by the execution of the application 216, is implemented as one or more specifically-configured hardware elements, such as field-programmable gate arrays (FPGAs) and/or application-specific integrated circuits (ASICs).

Figure 2B:
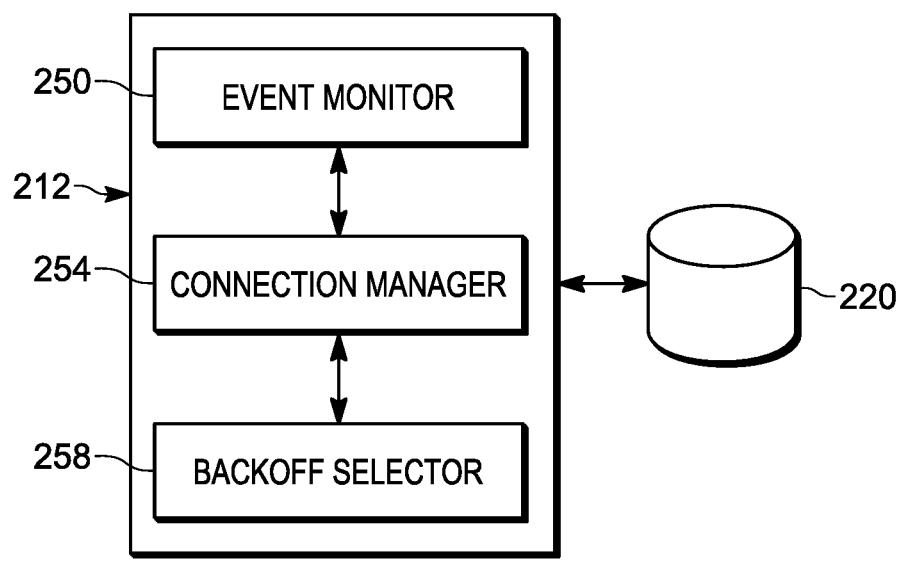
FIG. 2B is a block diagram of certain internal components of the client device of FIG. 2A.

Turning to FIG. 2B, certain components of the application 216 are illustrated. In other embodiments, the components of the application 216 may be implemented as a plurality of distinct applications executed by the processor 200. In further examples, one or more of the components of the application 216 shown in FIG. 2B can be implemented as specifically configured hardware elements, rather than as computer-readable instructions for execution by the processor 200. For example, one or more of the components shown in FIG. 2B can be implemented as an FPGA, and ASIC, or the like.

The application 216 includes an event monitor 250 configured to monitor events detected within the device 104 as well as events detected at the device 104 via notifications from other devices 104. Detected events can be stored in the repository 220 for further processing. The application 216 also includes a connection manager 254 configured to control the communications interface 212 to establish and maintain connections with the services (e.g. with the access points 108 and with the server 120). As will be discussed below, the connection manager 254 is configured to perform the above functions based in part on information obtained from a backoff selector 258. The backoff selector 258 is configured, under certain conditions, to select a backoff interval to delay connection attempts by the connection manager 254. In general, the components of the application 216 are configured to increment a default connection interval employed by the connection manager 254 by a backoff interval under certain conditions, to reduce the potential negative impact on service infrastructure of simultaneous re-connection attempts by substantial numbers of the devices 104.

Figure 3:
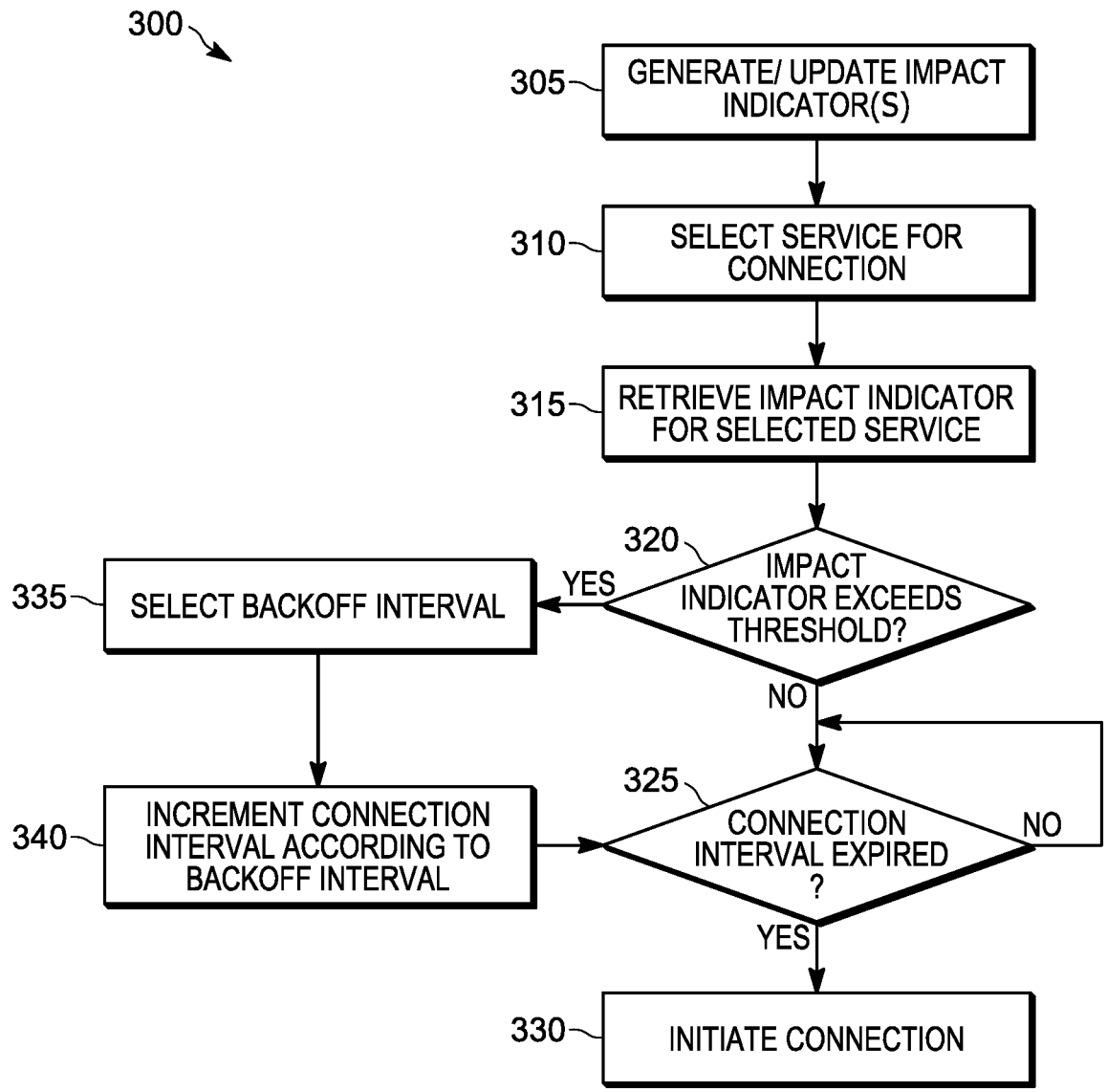
FIG. 3 is a flowchart of a method of mitigating connection impact on service infrastructure in the system of FIG. 1.

Turning now to FIG. 3, a method 300 of mitigating connection impact on service infrastructure is illustrated. The method 300 will be described in conjunction with its performance on the system 100. More specifically, the method 300 as described below is performed by the devices 104 in the system 100, with reference to the components of each device 104 as illustrated in FIGS. 2A and 2B. As will be apparent in the discussion below, each device 104 may perform a separate instance of the method 300.

Beginning at block 305, each device 104 (specifically, each event monitor 250) is configured to generate and update an impact indicator for each of one or more services. Thus, in the present example each device 104 may be configured to maintain two impact indicators: an impact indicator for WLAN connectivity via the access points 108 and controller 116, and an impact indicator for authentication via the server 120. As will be discussed below, each device 104 detects events for a given service that satisfy predetermined conditions, and generates the impact indicator for that service according to the number of events detected.

Figure 4:
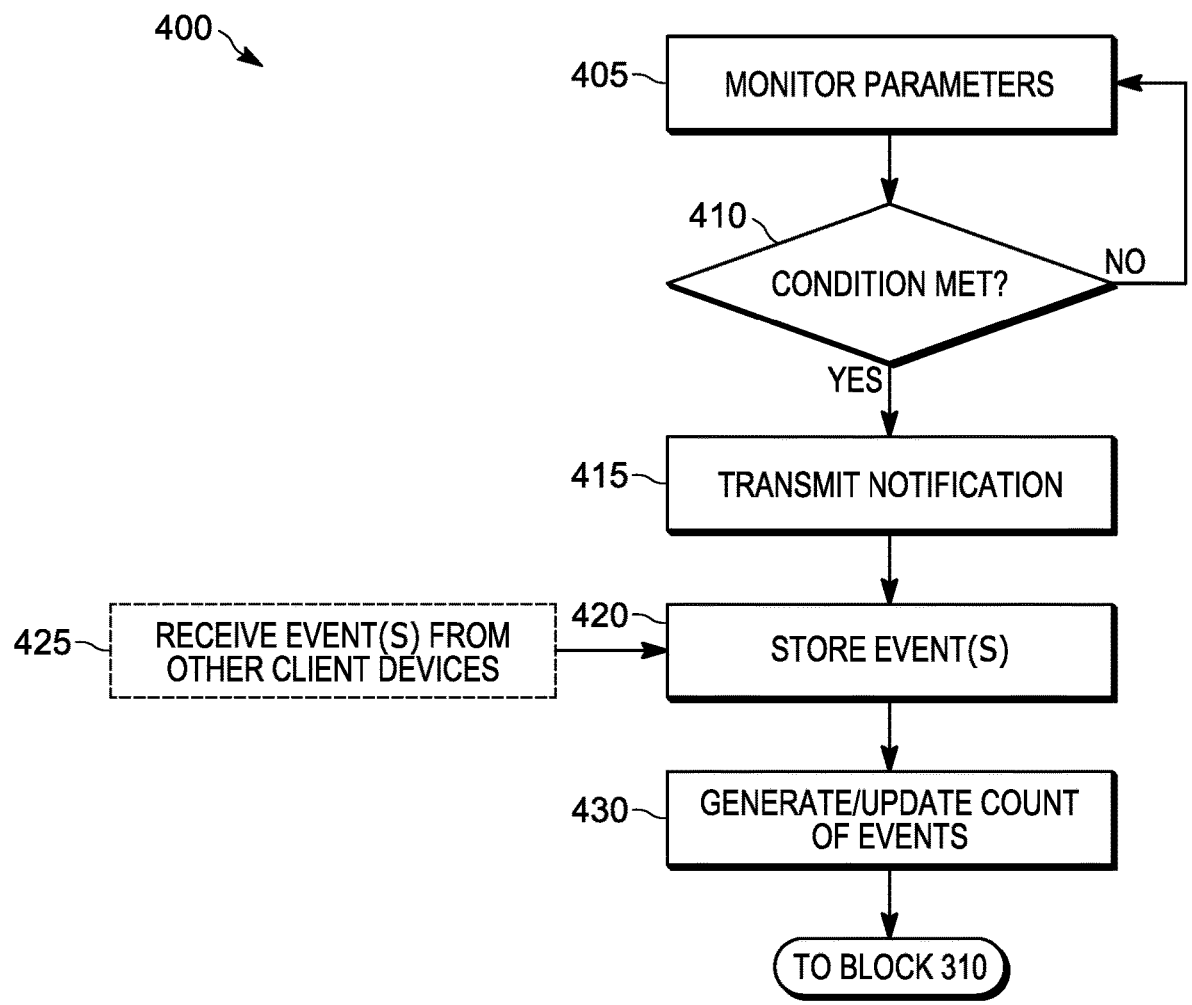
FIG. 4 is a flowchart of a method of generating and updating impact indicators in the method of FIG. 3.

Before continuing with the performance of the method 300, the generation and maintenance of impact indicators will be described in greater detail with reference to FIG. 4. FIG. 4 illustrates a method 400 of maintaining an impact indicator (i.e. of performing block 305 of the method 300) for a service. Each device 104 can be configured to perform a separate instance of the method 400 for each service. A brief overview of the method 400 will be provided below, followed by example implementations of the method 400.

At block 405, the device 104, and in particular the event monitor 250, is configured to monitor one or more predetermined parameters within the device 104. The predetermined parameters may be generated by the processor 200 via the execution of other applications. The parameters may also be generated by other elements of the device 104, such as the communications interface 212 or other interface assemblies (e.g. a charging interface for coupling the device 104 to a charger).

At block 410, the event monitor 250 is configured to determine whether the parameters monitored at block 405 satisfy one or more predetermined conditions. When the determination at block 410 is negative, the event monitor 250 continues monitoring the parameters at block 405. When the determination is affirmative, however, the performance of the method 400 proceeds to block 415 or optionally, directly to block 420. An affirmative determination at block 410, as will be discussed below in connection with the example implementations of the method 400, corresponds to the detection of an impact event at the device 104.

At block 415, the device 104 is configured to transmit an event notification indicating the impact event detected via blocks 405 and 410. The event notification is transmitted by controlling the communications interface 212, and may be transmitted using a peer-to-peer communication mechanism, such as Bluetooth™, Bluetooth low energy (BLE), Zigbee™, RFID or the like. The event notification may be broadcast for receipt by any other device 104 in sufficient physical proximity to the sending device 104, or may be addressed directly to one or more other devices 104. The content of the event notification includes at least an identification of the event and an identification of the service with which the event is associated. The event notification can also include an identifier of the device 104 transmitting the notification.

At block 420, the device 104 is configured to store the event detected via blocks 405 and 410 in the repository 220. The device 104 can also be configured to receive one or more event notifications from other devices 104 at block 425, for storage in the repository 220 at block 420. As will now be apparent, the event notifications received at block 425 are generated at the other devices via separate performances of the method 400. As noted above, the performance of the method 400 may proceed from block 410 directly to block 420. That is, in some embodiments, the transmission of a notification at block 415 may be omitted. In such embodiments, the receipt of events from other client devices at block 425 is typically also omitted, because the receipt of an event notification from another device 104 at block 425 is enabled by the transmission of a notification from that other device 104. In other words, for one device to receive an event notification at block 425, another device must transmit the notification by performing block 415.

At block 430, the event monitor 250 is configured to generate a count of the events stored in the repository 220. The count of events generate at block 430 can be stored in the repository. Thus, at block 430 the event monitor 250 can be configured to update a count previously stored in the repository for the relevant service. The count of events generated at block 430 is the impact indicator for the relevant service.

Certain example implementations of the method 400 will be now discussed in greater detail, with reference to FIGS. 5-8.

Figure 5:
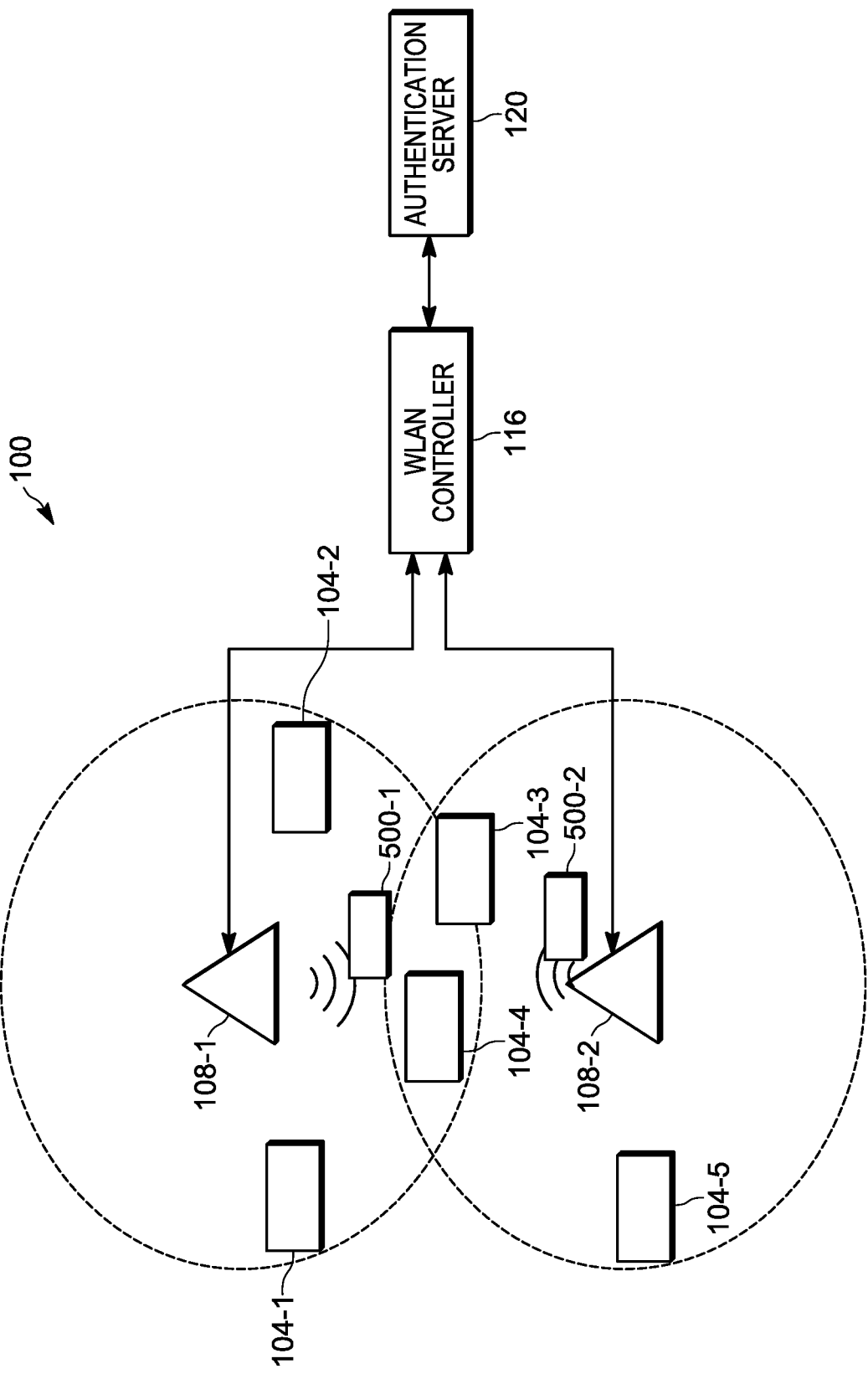
FIGS. 5-8 illustrate the system of FIG. 1 in various performances of the method of FIG. 3.

Turning to FIG. 5, the system 100 is shown following an outage of the WLAN infrastructure (e.g. due a loss of power within the facility). The devices 104 have therefore lost the connections shown in FIG. 1 with the access points 108. As noted earlier, each device 104 is configured to seek to re-establish lost connections such as those lost in FIG. 5. To that end, each device 104 can be configured to detect beacon messages from the access points 108 (once the access points 108 recover from the outage). In particular, the device 104-3 is shown receiving beacon messages 500-1 and 500-2 from the access points 108-1 and 108-2, respectively. Each beacon message 500 can include an identifier of the originating access point 108, as well as the service set identifier (SSID) corresponding to the WLAN deployed by the access point 108. In the present example, both access points 108 are assumed to deploy the same SSID (i.e. the access points 108 deploy a single common WLAN, named "108"). Each beacon 500 also includes, in this example, an indication of the total uptime for the corresponding access point 108 (i.e. the amount of time that has elapsed since the access point started operation).

At block 405, therefore, the device 104-3 receives the beacons 500. The event monitor 250-3, in this example, is configured to monitor the uptime in received beacons at block 405. Further, at block 410 the event monitor 250-3 is configured to determine whether the uptime indicated in each beacon 500 is smaller than a predetermined threshold, such as ten seconds in one non-limiting example. When the uptime is smaller than the predetermined threshold, the determination at block 410 is affirmative, and the event monitor 250-3 is configured to proceed to block 420. Block 415 (and therefore block 425) is omitted in this example performance of the method 400. At block 420, the event monitor 250-3 is configured to store an event corresponding to each beacon 500 that indicates an uptime that is below the predetermined (e.g., ten-second) threshold.

Table 1, below illustrates an example contents of the repository 220-3 of the device 104-3 after performing blocks 405-420.

TABLE 1

Repository 220-3

| Service ID | Access Point ID | Uptime (secs) | Uptime Condition | Impact Indicator |
|---|---|---|---|---|
| WLAN (SSID = 108) | 108-1 | 8 | <10 secs | 2 |
| WLAN (SSID = 108) | 108-2 | 6 | | |

As seen in Table 1, two event records are stored in the repository 220-3, the first corresponding to the beacon 500-1 and the second corresponding to the beacon 500-2. Both beacons 500 indicate that the access points 108-1 and 108-2 have uptimes of less than ten seconds, indicating that the access points 108 have started operating recently (i.e. indicating a possible recent outage).

At block 430, the event monitor 250-3 is configured to generate a count of the events recorded at block 420. Thus, in the present example, the repository 220-3 includes an event count, which is the impact indicator, of two. In other examples performances of the method 400, in which only one of the beacons 500 indicates an uptime of less than ten seconds, the impact indicator has a value of one instead of a value of two. Although the condition evaluated at block 410 and the count generated at block 430 are shown in Table 1 along with the events stored at block 420, in other embodiments the events, the condition and the impact indicator need not be stored in the format shown above. They may, for example, be stored in separate tables or fields in the repository 220.

As will be apparent, referring again to FIG. 5, the other devices 104 can also be configured to perform the method 400. If the other devices 104 perform the method 400 substantially simultaneously with the device 104-3, or earlier than the device 104-3, each other device 104 arrives at an impact indicator with a value of two, as the other devices receive the beacons 500-1 and 500-2 as discussed above.

Figure 6:
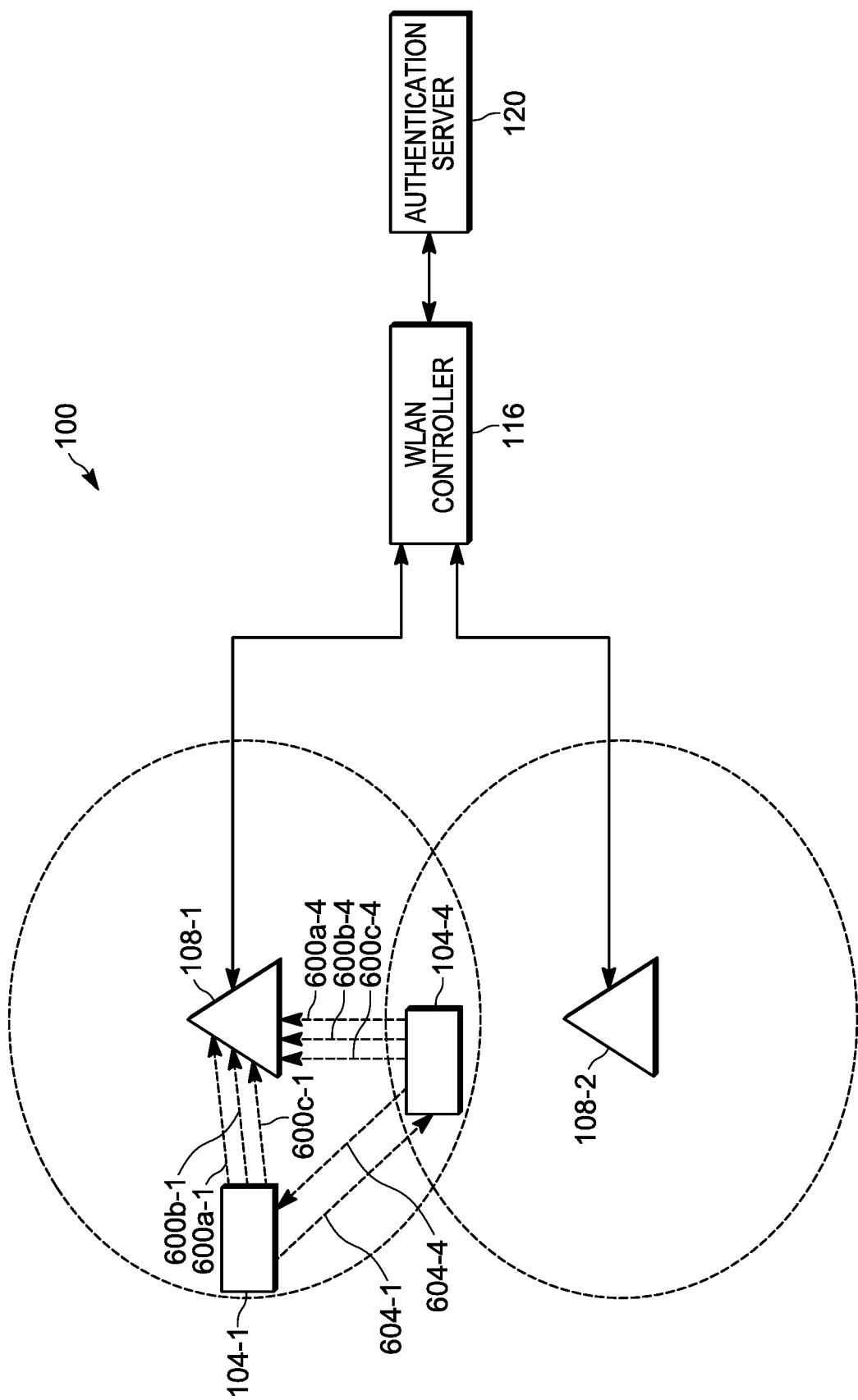

Turning now to FIG. 6, another example performance of the method 400 will be discussed. FIG. 6 illustrates the system 100, with the devices 104-2, 104-3 and 104-5 omitted for simplicity. The devices 104-1 and 104-4 are shown attempting to establish respective connections with the access point 108-1. In this example performance of the method 400, each device 104 is configured to monitor, at block 405, the status of connection attempts. At block 410, each device is configured to determine whether the number of failed connection attempts (e.g. within a predetermined time period, such as within the past fifteen seconds) exceeds a threshold. In the present example, the threshold is two failed connections. FIG. 6 illustrates three failed connection attempts 600a, 600b, 600c for each of the devices 104-1 and 104-4. The connection attempts for the device 104-1 are labelled with the suffix "-1", while the connection attempts for the device 104-4 are labelled with the suffix "-4".

Responsive to detecting at block 410 that three connection attempts have failed within the predetermined time period, each of the devices 104-1 and 104-4 is configured to transmit a respective notification 604-1 and 604-4 to the other device 104, indicating the detection of a consistent failure-to-connect event (i.e. a number of failed connections exceeding the threshold). The notifications 604 are illustrated in FIG. 6 as being sent directly to the device 104-1 or 104-4, but in other examples the notifications 604 are broadcast, multicast or the like, such that they are also received by other nearby devices (which may have already successfully connected to the access points 108, but which nevertheless store a consistent failure-to-connect event responsive to detecting the notification).

Each device 104 is also configured to store the detected event in its respective repository 220. Each notification 604 can contain an identifier of the device 104 sending the notification, and an identifier of the relevant service (i.e. the service to which the device 104 is attempting to connect). The notification 604 may also contain the number of failed connection attempts at the device sending the notification 604. However, the number of failed connection attempts may also be omitted, as the existence of the notification indicates that the sending device 104 has experienced at least the threshold number of failed connection attempts.

Each of the devices 104-1 and 104-4 is also configured, at block 425, to receive the notification 604 from the other device, and to store the event described in the notification in the respective repository 220. Thus, after the performance of blocks 405-425, the repository 220-1 of the device 104-1 contains two consistent failure-to-connect events, one detected at the device 104-1 itself, and the other detected via the notification 604-4. At block 430, each of the devices 104-1 and 104-4 is configured to generate or update a count of consistent failure-to-connect events contained in the respective repository 220. After the performance of block 430 by the device 104-1, for example, the repository 220-1 may appear as shown below in Table 2.

TABLE 2

Repository 220-1

| Service ID | Device ID | Failed attempts | Failed Attempt Condition | Impact Indicator |
|---|---|---|---|---|
| WLAN (SSID = 108) | 104-1 | 3 | >2 failed attempts | 2 |
| WLAN (SSID = 108) | 104-4 | 3 | | |

As seen above, the impact indicator generated at block 430 by the device 104-1 has a value of two, indicating that two instances of a greater number of failed connection attempts than the predetermined threshold have been detected. As noted earlier, the data in Table 2 need not be stored in the format shown above.

Figure 7:
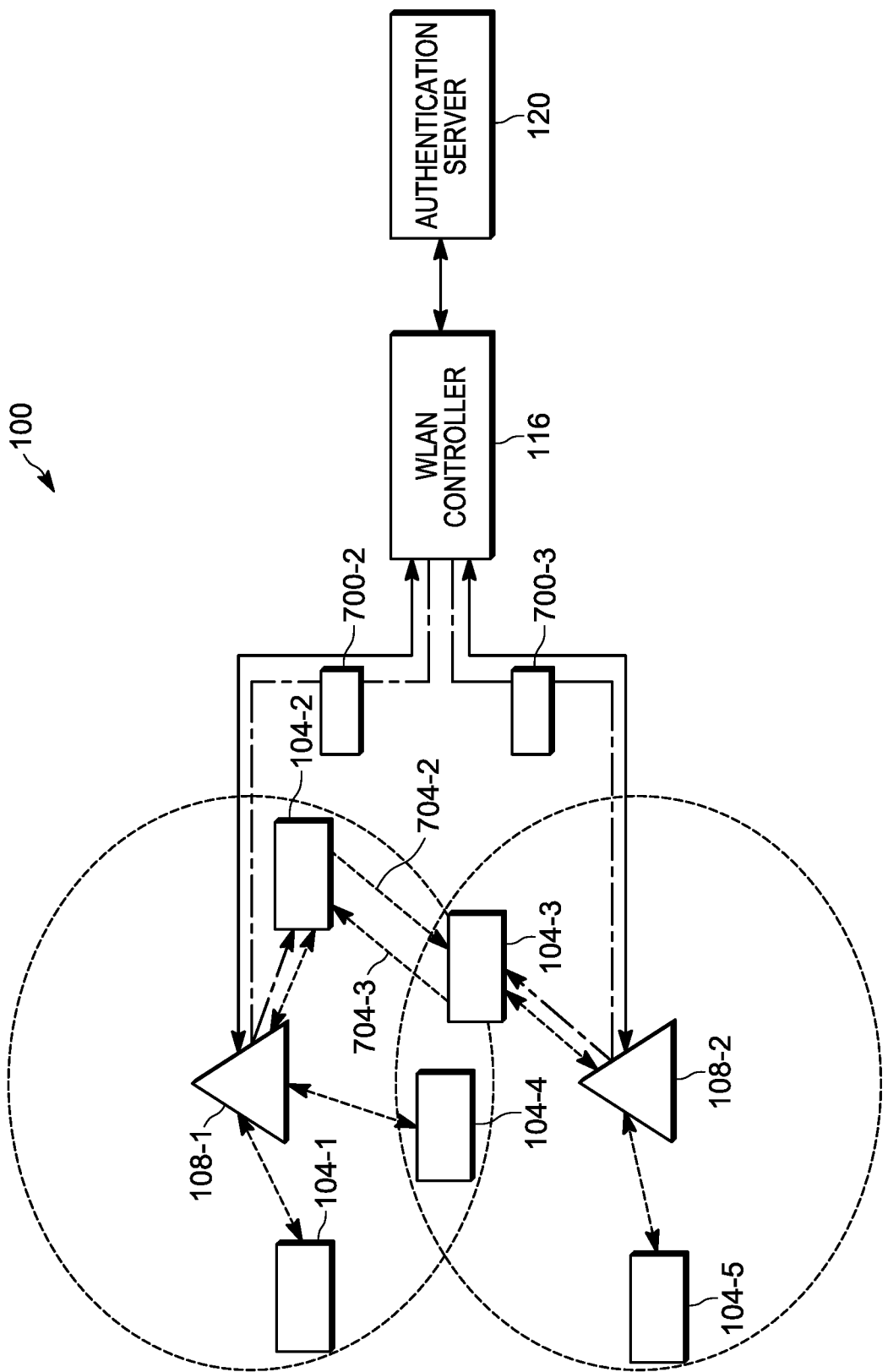

Turning now to FIG. 7, a further example performance of the method 400 will be described. FIG. 7 illustrates the system 100 with all devices 104 connected to the access points 108. Also illustrated are configuration instructions 700-2 and 700-3 transmitted, respectively, to the devices 104-2 and 104-3 by the WLAN controller 116. The configuration instructions 700 may include instructions to alter a password, client identifier or the like with which the devices 104-2 and 104-3 are configured to connect to the authentication server 120. Thus, implementing the changes defined by the instructions 700 requires the devices 104-2 and 104-3 to disconnect from and reconnect to the server 120.

In other words, the parameters monitored at block 405 by the devices 104 include instructions to change one or more service configuration parameters for a given service. The condition assessed at block 410 includes determining whether the instructions to change configuration parameters affect a predetermined subset of configuration parameters that are known to require reconnection to the service if changed (e.g. password, client identifier, service URL and the like). At block 410, therefore, each of the devices 104-2 and 104-3 are configured to determine whether the instructions 700 include changes to any of the above-mentioned parameters. When the determination is affirmative, as in the present example, the devices 104-2 and 104-3 are each configured to transmit respective notifications 704-2 and 704-3. The notifications 704 contain an identifier of the service associated with the configuration change events (in this example, the authentication service provided by the server 120), and may also contain an identifier of the sending device. As noted above in connection with FIG. 6, the notifications 704-3 and 704-2 are illustrated as being sent directly to the devices 104-2 and 104-3, respectively. However, in other examples the notifications 704 may also be directed to the other devices 104 in the system 100, for example via broadcast.

At block 420, the device 104-2 is therefore configured to store events detected via blocks 405 and 410, as well as events detected via block 425 (i.e. via the receipt of the notification 704-3). The device 104-2 is configured, at block 430, to generate an impact indicator in the form of a count of events stored at block 420. Table 3, below, shows example contents of the repository 220-2 of the device 104-2 following the performance of block 430.

TABLE 3

| Repository 220-2 | | | | |
|---|---|---|---|---|
| Service ID | Device ID | Config. Changes | Condition | Impact Indicator |
| Authentication 120 | 104-2 | Password | Changes require reconnection? | 2 |
| Authentication 120 | 104-3 | Password, client ID | | |

As seen in Table 3, the impact indicator generated at block 430 by the device 104-2 has a value of two, indicating that two instances of configuration changes requiring reconnection to the server 120 have been detected. As noted earlier, the data in Table 3 need not be stored in the format shown above.

Figure 8:
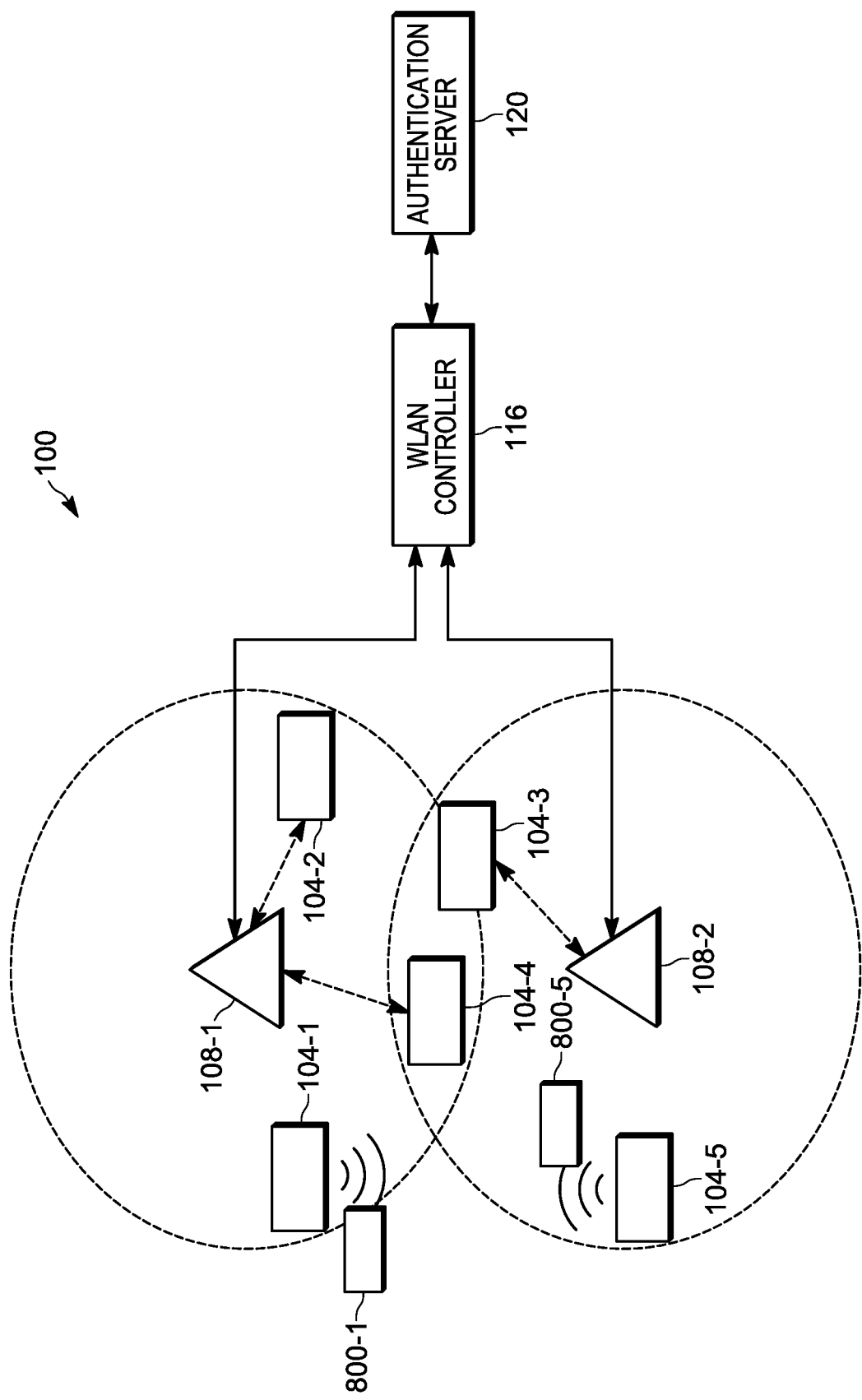

Turning now to FIG. 8, a further example performance of the method 400 will be described. FIG. 8 illustrates the system 100, in which the devices 104-2, 104-3 and 104-4 are connected to the access points 108, while the devices 104-1 and 104-5 have not yet established connections to the access points 108. In particular, in this implementation of the method 400, the devices 104-1 and 104-5 are assigned to a shift that is beginning, and have therefore recently been powered on, removed from charging cradles (not shown), or the like.

At block 405, the parameters that devices 104 are configured to monitor include power state parameters, such as whether the device is on, off or idle, whether the device is connected to a charging cradle, and the like. The condition evaluated at block 410 in this example is whether the power state parameters indicate a device activation. For example, a change in the power state parameter from idle or off to powered on (e.g. in response to activation of a power button or power switch) may result in an affirmative determination at block 410. As a further example, a detection by the processor 200 that the device 104 has been removed from a charging cradle may result in an affirmative determination at block 410.

Responsive to an affirmative determination at block 410, the devices 104-1 and 104-5 are each configured, via respective performances of block 415, to send notifications 800-1 and 800-2. The notifications 800-1 and 800-2 contain a service identifier and an indication that an activation event has been detected. For example, the notifications 800 can include an identifier of which activation was detected (e.g. power-on or off-cradle). The notifications 800 may also include identifiers of the sending devices.

In addition to storing the activation event detected locally at block 420, the devices 104-1 and 104-5 also receive (at block 425) the notifications 800-5 and 800-1, respectively, and store the activation events defined therein in the respective repository 220. The other devices in the system 100 may also receive and store the notifications 800-1 and 800-5. At block 430, the devices 104-1 and 104-5 are configured to generate a count of the activation events store in the respective repositories 220. Table 4, below, shows example contents of the repository 220-1 of the device 104-1 following the performance of block 430.

TABLE 4

| Repository 220-1 | | | | |
|---|---|---|---|---|
| Service ID | Device ID | Activation Detected | Condition | Impact Indicator |
| WLAN (SSID = 108) | 104-1 | Off-Cradle | Device Activation? | 2 |
| WLAN (SSID = 108) | 104-5 | Power-On | | |

As seen in Table 4, the impact indicator generated at block 430 by the device 104-1 has a value of two, indicating that two device activations have been detected (one at the device 104-1 itself, and one via receipt of the notification 800-5). As noted earlier, the data in Table 4 need not be stored in the format shown above. Similarly, the condition evaluated at block 410, although shown in Table 4, need not be stored in the repository 220.

Table 5 summarizes the examples of impact indicator generation discussed above. As will be apparent, although each of the examples above relates to one of the WLAN and authentication services, each of the examples may also be applied to the other of the WLAN and authentication services. For example, the beacons 500 or any other suitable message broadcast by the access points 108 can include an uptime indicator for the server 120, permitting the implementation discussed in connection with FIG. 4 to be performed for the authentication service. The impact indicator generation mechanisms discussed above may also be applied to other services than WLAN connectivity and authentication.

TABLE 5

Summary of Example Impact Indicator Generation

| Parameter Monitored (405) | Condition Evaluated (410) | Events Stored/ Counted (420/430) | Notifications? (415/425) |
|---|---|---|---|
| Uptime | Uptime < threshold? | Event per uptime below threshold | No |
| Failed connection attempts | Failed attempts > threshold? | Event per exceedance of failed attempt threshold | Yes |
| Configuration changes | Change requires reconnection? | Event per change requiring reconnection | Yes |
| Device activations | Activations detected? | Event per device activation | Yes |

Returning to FIG. 3, having generated or updated the impact indicator at block 305, the device 104—and particularly the connection manager 254—is configured to select a service for connection. The service selected at block 310 is typically a service that the device 104 is configured to automatically establish or re-establish a connection with, and that the device 104 is not connected with when block 310 is performed. For example, the connection manager 254, responsive to loss of a connection with an access point 108, can be configured to select either or both of the WLAN and authentication services at block 310. The loss of connection can occur due to an outage suffered by the WLAN infrastructure, a disconnection resulting from the application of updated configuration parameters at the device 104, or the like.

At block 315, having selected a service for connection, the device 104 is configured to retrieve the impact indicator generated or updated at block 305 for the selected service. More specifically, the backoff selector 258 is configured to retrieve the impact indicator from the repository 220 corresponding to the selected service. Thus, if the selected service is WLAN connectivity, the backoff selector 258 can be configured to retrieve the impact indicator (e.g. the event count) stored in association with the service identifier "WLAN (SSID=108)" from the repository 220 (e.g. as shown in Tables 1, 2 or 4).

At block 320, the backoff selector 258 is configured to determine whether the impact indicator retrieved from storage at block 315 exceeds a predetermined impact threshold. The impact threshold, in the present example, is preconfigured in the backoff selector 258 as a number of events. If the impact indicator (which, as noted above, is a count of events) exceeds the threshold, the performance of the method 300 proceeds to block 335. Otherwise, the performance of the method 300 proceeds to block 325, bypassing the selection of a backoff interval, discussed below.

Various impact thresholds may be applied by the device 104. For example, the impact threshold may be set at zero, such that any event detection (e.g. the detection of a single access point 108 with uptime below the ten-second threshold mentioned earlier) results in an affirmative determination at block 320. As a further example, the impact threshold may be set sufficiently high to require detection of a number of events equal to the number of event sources (e.g. devices 104, access points 108). For example, in a system with eight access points 108 where devices 104 monitor access point uptime to generate impact indicators, the impact threshold may be set at seven, such that the determination at block 320 is affirmative only when every access point has an uptime below the uptime threshold (e.g. ten seconds, as mentioned earlier). Impact thresholds between the two bounds noted above may also be employed.

At block 325, the connection manager 254 is configured to determine whether a connection interval has expired. The connection interval is a period of time after which the connection manager 254 is configured to initiate a connection with the service selected at block 310. The connection interval can have a default value of zero. In other examples, the connection interval can have a default value greater than zero, such as 100 milliseconds. Following expiry of the connection interval, the connection manager 254 initiates a connection with the selected service at block 330. For example, when the selected service is WLAN connectivity, at block 330 the connection manager 254 can be configured to control the communications interface to transmit a probe request, association request or the like to one of the access points 108 to initiate establishment of a wireless connection with the access point 108. When the determination at block 325 is negative, the connection manager 254 is configured to repeat the determination.

Following an affirmative determination at block 320, however, performance of the method 300 proceeds to block 335. An affirmative determination at block 320 is a determination that the events detected via the performance of the method 400 at the device 104 indicate that connecting to the service selected at block 310 without some mitigating action is likely to have a negative impact on the service infrastructure. At blocks 335 and 340, therefore, the device 104 implements such mitigating action.

At block 335, the backoff selector 258 is configured to select a backoff interval. In some examples, the backoff selector 258 is configured to perform block 335 by selecting one of a plurality of predefined backoff intervals. For example, each device 104 can store, in the memory 204, an indication of a plurality of backoff intervals (e.g., backoff intervals of 1, 3, 5, 8, 17, 20, 30, and 40 seconds). In other examples, each device 104 can store a plurality of sequential predefined backoff slots, each with a predefined length (e.g. twenty predefined slots, each having a length of two seconds). At block 335, in such embodiments, the backoff selector 258 can be configured to select one of the above-mentioned backoff intervals, or one of the above-mentioned backoff slots (which slot is selected determines the backoff interval). The selection is made, in the present example, at random at each device 104. For example, each device 104 can be configured to employ a portion of the device media access control (MAC) address as a seed for a random number generator executed by the processor 200. The resulting random number is employed to select a backoff interval from the predefined intervals or slots.

At block 340, following selection of the backoff interval by the backoff selector 258, the connection manager 254 is configured to increment the above-mentioned default connection interval by the selected backoff interval. Thus, if the default connection interval is zero and the selected backoff interval is eight seconds (which may be selected directly, or via the selection of the fourth two-second slot as mentioned above), at block 340 the connection interval is incremented to eight seconds. The connection manager 254 then proceeds to block 325, as discussed above.

The selection of a backoff interval at block 335 and the incrementing of the connection interval with the backoff interval is configured to delay the initiation of the connection at block 330 sufficiently to mitigate the potential impact of multiple simultaneous connection requests arriving at the same access point 108 or other service node (e.g. the server 120). In other words, the selection and application of a backoff interval by each device 104 serves to spread out connection or reconnection attempts by the devices 108 under conditions that may otherwise result in high loading of the selected service.

Variations to the systems and methods above are contemplated. For example, in some embodiments the events detected via the method 400 are stored with timestamps indicating when each event was detected. Any events older than a predetermined, configurable age (e.g. 60 seconds) are deleted from the repository 220.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a client device of mitigating connection impact on service infrastructure, comprising:
prior to initiating a connection between the client device and a service, generating, at the client device, an impact indicator representing a predicted load at the service by:
  (i) detecting, at the client device, a set of events associated with the service; and
  (ii) generating a count of the events;
determining whether the impact indicator exceeds an impact threshold;
when the impact indicator exceeds the impact threshold, incrementing a connection interval according to a backoff interval; and
initiating a connection with the service upon expiry of the connection interval,
wherein:
  detecting the set of events associated with the service comprises generating a first subset of the events responsive to detecting that a condition has been met at the client device, generating the first subset of the events including monitoring an indication of uptime received from an access point associated with the service and the condition including a maximum uptime threshold, and the service is one of a wireless network and an authentication server.

2. The method of claim 1, wherein detecting the event associated with the service further comprises:

receiving a second subset of the events from another client device.

3. The method of claim 1, wherein the threshold defines a number of events.

4. The method of claim 1, further comprising:

responsive to generating the first subset of the events, transmitting the first subset of the events to another client device.

5. The method of claim 4, further comprising transmitting the first subset of the events to the other client device using a peer-to-peer wireless interface.

6. The method of claim 1, wherein the generating the first subset of the events includes monitoring a status of previous attempts to connect to the service; and wherein the condition includes a minimum threshold number of failed previous attempts.

7. The method of claim 1, wherein generating the first subset of the events includes monitoring the client device for configuration changes that require reconnection to the service.

8. The method of claim 1, wherein generating the first subset of the events includes monitoring the client device for one or more of an off-cradle state and a power-on state.

9. A client device for mitigating connection impact on service infrastructure, comprising:

a communications interface;

a processor interconnected with the communications interface, the processor configured to:

prior to initiating a connection between the client device and a service, generate, at the client device, an impact indicator representing a predicted load at the service by:

(i) detecting a set of events associated with the service; and (ii) generating a count of the events;

determine whether the impact indicator exceeds an impact threshold;

when the impact indicator exceeds the impact threshold, increment a connection interval according to a backoff interval; and initiate a connection with the service upon expiry of the connection interval;

wherein:

the processor is further configured to detect the set of events associated with the service by generating a first subset of the events responsive to detecting that a condition has been met at the client device, the first subset of the events generated by monitoring an indication of uptime received from an access point associated with the service and the condition including a maximum uptime threshold, and the service is one of a wireless network and an authentication server.

10. The client device of claim 9, wherein the processor is further configured to detect the set of events associated with the service by:

receiving, via the communications interface, a second subset of the events from another client device.

11. The client device of claim 9, wherein the threshold defines a number of events.

12. The client device of claim 9, the processor further configured to:

responsive to generating the first subset of the events, transmit the first subset of the events to another client device.

13. The client device of claim 12, the processor further configured to transmit the first subset of the events to the other client device using a peer-to-peer wireless interface.

14. The client device of claim 9, wherein the processor is further configured to generate the first subset of the events by monitoring a status of previous attempts to connect to the service; and wherein the condition includes a minimum threshold number of failed previous attempts.

15. The client device of claim 9, wherein the processor is further configured to generate the first subset of the events by monitoring the client device for configuration changes that require reconnection to the service.

16. The client device of claim 9, wherein the processor is further configured to generate the first subset of the events by monitoring the client device for one or more of an off-cradle state and a power-on state.

* * * * *